United States Patent
Asokan et al.

(10) Patent No.: US 12,227,458 B2
(45) Date of Patent: *Feb. 18, 2025

(54) HIGH PERFORMANCE GLOSSY FINISH GREEN HYBRID COMPOSITES WITH VARIABLE DENSITY AND AN IMPROVED PROCESS FOR MAKING THEREOF

(71) Applicant: COUNCIL OF SCIENTIFIC AND INDUSTRIAL RESEARCH, New Delhi (IN)

(72) Inventors: Pappu Asokan, Habibganj Naka Bhopal (IN); Manoj Kumar Gupta, Habibganj Naka Bhopal (IN); Alka Mishra, Habibganj Naka Bhopal (IN); Edward Peters, Habibganj Naka Bhopal (IN); Ajay Kulshreshth, Habibganj Naka Bhopal (IN); Sanjai Kumar Singh Rathore, Habibganj Naka Bhopal (IN); Avanish Kumar Srivastava, Habibganj Naka Bhopal (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 878 days.

This patent is subject to a terminal disclaimer.

(21) Appl. No.: 17/052,193

(22) PCT Filed: Feb. 9, 2019

(86) PCT No.: PCT/IN2019/050107
§ 371 (c)(1),
(2) Date: Nov. 1, 2020

(87) PCT Pub. No.: WO2019/211862
PCT Pub. Date: Nov. 7, 2019

(65) Prior Publication Data
US 2021/0053875 A1    Feb. 25, 2021

(30) Foreign Application Priority Data
May 4, 2018   (IN) .............................. 201811016873

(51) Int. Cl.
*C04B 26/18*   (2006.01)
*C04B 18/04*   (2006.01)
(Continued)

(52) U.S. Cl.
CPC .......... *C04B 26/18* (2013.01); *C04B 18/0481* (2013.01); *C04B 18/08* (2013.01);
(Continued)

(58) Field of Classification Search
CPC ... C04B 14/285; C04B 18/04; C04B 18/0481; C04B 18/06; C04B 18/08; C04B 18/12;
(Continued)

(56) References Cited

U.S. PATENT DOCUMENTS

| 2002/0016420 A1* | 2/2002 | Zarnoch | C08G 65/485 |
| | | | 525/418 |
| 2015/0197943 A1* | 7/2015 | Ziegler | B44C 5/0438 |
| | | | 428/308.8 |

OTHER PUBLICATIONS

Singh et al, "Polyester Moulding Compounds of Natural Fibres and Wollastonite", Composites: Part A, vol. 34, No. 11, (2003), pp. 1035-1043 (Year: 2003).*

(Continued)

*Primary Examiner* — Frances Tischler
(74) *Attorney, Agent, or Firm* — Blank Rome LLP

(57) ABSTRACT

The present invention deals with development of a novel process for manufacturing moisture resistant glossy finish hybrid green polymeric composites with variable density in range of 0.2-1.68 g/cc, low water/moisture absorption in the range of 0.1-1.3%, tensile strength and tensile modulus in range of 6.5-105 MPa and 250-6850 MPa, respectively and to the best of our knowledge the fabricated hybrid green (Continued)

composites has not yet developed universally using different types of industrial wastes particulates. Moreover, hybrid composites developed using industrial wastes, natural fibres and epoxy/polyester/polyurethane polymers is a unique materials and have multifunctional applications in wider spectrum as an alternative to wood, synthetic wood, wood plastic composites, screen printing sheet, plastic, fibre and glass reinforced polymer products, including tin sheet.

17 Claims, 3 Drawing Sheets

(51) Int. Cl.
| | |
|---|---|
| *C04B 18/08* | (2006.01) |
| *C04B 18/12* | (2006.01) |
| *C04B 18/14* | (2006.01) |
| *C04B 18/16* | (2023.01) |
| *C04B 18/20* | (2006.01) |
| *C04B 18/24* | (2006.01) |
| *C04B 26/16* | (2006.01) |
| *C04B 111/00* | (2006.01) |

(52) U.S. Cl.
CPC .............. *C04B 18/12* (2013.01); *C04B 18/14* (2013.01); *C04B 18/16* (2013.01); *C04B 18/20* (2013.01); *C04B 18/248* (2013.01); *C04B 26/16* (2013.01); *C04B 2111/00767* (2013.01); *C04B 2201/20* (2013.01)

(58) Field of Classification Search
CPC ......... C04B 18/14; C04B 18/16; C04B 18/20; C04B 18/24; C04B 18/248; C04B 18/30; C04B 20/0048; C04B 20/023; C04B 20/026; C04B 20/04; C04B 2111/00767; C04B 2111/27; C04B 22/064; C04B 22/146; C04B 2201/20; C04B 26/14; C04B 26/16; C04B 26/18; C04B 40/0071; C04B 40/0263; C04B 2111/00612; H04N 13/111; H04N 13/139; H04N 13/172; H04N 13/194; H04N 21/21805; H04N 21/234345; H04N 21/2353; H04N 21/2381; H04N 21/2387; H04N 21/4402; H04N 21/4728; H04N 21/6587; H04N 21/816; H04N 21/84; H04N 21/85406; Y02W 30/91

See application file for complete search history.

(56) References Cited

OTHER PUBLICATIONS

P. Kumar et al., "Development of novel natural composites with fly ash reinforcements and investigation of their tensile properties," Applied Mechanics and Materials, (2016), 852 55-60).

R. V. Rao et al., "Behavior of sandwich composites under flexural and fatigue loading: effect of variation of core density," J. Eng. Sci. and Tech., (2011) 3 7598-7607.

R. Velmurugan et al., "Mechanical properties of glass/pylmyara fiber waste. sandwich composites," Indian J. Engg & Mater Sci., (2005) 12 563-570).

P. Asokan et al., "Recent Advances on Fly ash Particulates and Biofiber Reinforced Lightweight Hybrid. Sandwich Composites," Int. J. of. Engineering Research and Technology, (2013) 2, 2914-2923.

H.T. Draghicescu et al., "Thermomechanical Response of a Thin Sandwich Composite Structure," Engineering Letters (2010) 18, 08.

M.R. Doddamani, et al., "Compressive properties of sandwiches with functionally graded rubber core and jute-epoxy skins," Bull. Mater. Sci., (2013) 36, 319-328).

P. Asokan et al., "Towards sustainable micro and nano composites from fly ash and natural fibers for multifunctional applications," Vacuum (2017) 146, 375-385).

* cited by examiner

HIGH PERFORMANCE GLOSSY FINISH GREEN HYBRID COMPOSITES WITH VARIABLE DENSITY AND AN IMPROVED PROCESS FOR MAKING THEREOF

CROSS REFERENCE TO RELATED APPLICATIONS

This application is a national phase of PCT application No. PCT/IN2019/050107, filed May 2, 2019, which claims priority to IN patent application No. 201811016873, filed May 4, 2018, all of which are incorporated herein by reference thereto.

FIELD OF THE INVENTION

The present invention relates to a process for making moisture resistant glossy finish hybrid green composites with variable density using different industrial waste particulates, natural fibres/fabrics/textiles with polymers such as epoxy/polyester resin and polyurethane and sandwich composites for multifunctional application in wide spectrum as an alternative to timber, plastic and FRP/GRP products. Preparation process describe a method for manufacturing high performance glossy finish hybrid green composites with low water absorption and variable density and with and without incorporation of fibers (natural/plant fibres, glass fibre and/or textiles) with waste particulates (marble waste, fly ash, lime and gypsum rich wastes mineral, metallurgical, chemical, fertiliser industry wastes, polymeric waste) reinforced using polymeric binder system (epoxy/polyester resin and polyurethane resin) under a simple and improved one stage single operation mode at varying temperature of 16-75° C. and at varying casting pressure from 2-95 kg/cm$^2$. Preparation process describes the direct screen printing/laminating directly on surface of the hybrid composite sheet. The specific applications of the composites are for building construction and transportation system such as cars, buses, trains, boat, ships, and aircrafts.

BACKGROUND OF THE INVENTION

Composite materials are manufactured using glass, carbon, aramid fibre with synthetic polymer or and metal oxides or using any binder system for use in a variety of applications.

Earlier work in the Pat, No. US 20050252419 A1 by Mabey Michael, 2005 claimed the lightweight composite or mineral foam composite materials made from reactive materials such as metal oxide, phosphates, reactive foaming agent and or latex polymer. This lightweight composite exhibits density between 0.35 to 2.25g/cc. Most of the substances like magnesium oxide, short chopped glass fibre, boric acid, hydrogen peroxide, fly ash, Tykoye 2200 latex polymer are used in this process. The composites are not so lightweight to use them as a architectural interior in train, bus, and other transport system and as a potential false ceiling component in building construction sectors including transport system (train, car, bus, ship etc.), airport and other infrastructure. Furthermore, the relative strength of the materials has not been reported and most of the raw materials for making these lightweight materials inputs are expensive and not readily available.

Reference may be made to U.S. Pat. No. 6,605,650 B1 wherein a process of making lightweight, rigid polyurethane foam by forming a mixture of isocyanate, polyol reactants, catalyst and blowing agent including expandable polystyrene beads under the exothermic reaction at about 150° C. Though the density of the rigid foam and its corresponding water absorption, tensile properties are not reported, the process know how is not as to that of the lightweight composites developed in the present invention. Moreover, the rigid polyurethane foam may not be useful to meet the materials performance to use as a potential architectural interiors in building and transport system.

There were many constraints and drawbacks associated with composites developed earlier by many researchers. Density, water absorption along with strength is the one of the primary concern.

Reference may be made to U.S. Pat. No. 8,518,312 B2, wherein lightweight multi-layered structural composites described, however no information is available on the density and the moisture/water absorption, further the raw materials, process of making the composite sheet and the core materials are different from the present invention. In the present invention deals with fabrication of high performance glossy finish moisture/water resistance green composites, using industrial waste particulates (particulates arising from any type of waste stream) together with or without short/textile fibres (glass/carbon/sisal/jute/aramid/banana/hemp/flax/cotton fibres or any other fibres) reinforced with epoxy/polyester/polyurethane binder system as a single moulded finished products in single operation.

Reference may be made to U.S. Pat. No. 6,767,634, wherein a method for fibrillated bast fibers as reinforcement for polymeric composites was described.

However, U.S. Pat. No. 6,767,634B2 has not described the simultaneous use of fibres and inorganic waste particulates for making moisture resistant glossy finish composite sheet with variable density. Moreover, present invention deals with a simple process for processing the fibres and fabricating moisture resistant composite sheet with out using ultrasonic energy and injection moulding machine.

Reference may be made to U.S. Pat. No. 6,939,903B2, wherein, a method for natural fiber-filled polyolefin composites was described. However, composite sheet is prepared by sizing a natural fiber (wood flour, wood fiber, and agricultural fiber) with a reactive organosilane and their mixing with mixing a high density polyethylene resin and also polyolefin coupling agent was utilised for functionalizion. However, density, moisture/water absorption, size, thickness of composite sheet was not given. In present invention, fibres such as sisal/jute fibres, industrial waste particulates (fly ash, red-mud, marble wastes etc.) are processed using simple methods such as hot water soaking and their drying in oven and compression moulding techniques is used to achieve the moisture resistant glossy finish hybrid composite reinforced with fibres and or industrial waste particulates with variable density in single operation mode using compression moluding without any functionlisation.

Reference may be made to Indian Pat. No. 222013 (253/DEL/2003), wherein a method is described for making fly ash, wood flour and polyurethane resin based composite sheet using compression moulding machine. The density for fabricated composite sheet was only in range of 0.7-0.8 g/cc and no water/moisture resistant properties are reported. However, the in reported method, only compressive pressure was varied and only fly ash was used as filler. The work claim in Indian Pat. No. 222013 (253/DEL/2003) did not describe glossy finish and wide density variation along with low water/moisture absorption.

Reference may be made to Korean Pat. No. KR101045888B1, wherein a method for producing a natural fiber/polycardanol bio-composite materials was described.

Silane-treated kenaf (kenaf), jute (jute), sisal (sisal), bananas (banana) fibers and polycarbodiimide were used and compression moulding techniques was used. Further natural composites with fly ash reinforcements was reported wherein, a hand lay-up method was used for fabricate the fly-ash fibres reinforced composite [see, e.g. A. P. Kumar et al, *Development of novel natural composites with fly ash reinforcements and investigation of their tensile properties*, Applied Mechanics and Materials, (2016), 852 55-60]. The develop sheet has low mechanical properties, and many properties such as density, moisture/water absorption glossy finish surface are not mentioned. However, in the reported work, fibres are processed with ethanol, water and fires are hydrolysed and composite sheet was fabricated under high temperature of 190° C. However, there is no report on the density variation and water absorption and utilisation of industrial waste along with the fibres with epoxy/polyester resin. In the present invention, we claim a method to fabricate moisture resistant glossy finish hybrid composite sheet with variable density from 0.2 to 1.68 g/cc and low water absorption in range of 0.1 to 1.3%, using a method of controlling pressure and temperature in single operation mode. Moreover, present invention deals with the use of various industrial particulates including marble and granite waste and various natural fibres for manufacturing hybrid composite for multifunctional application.

The E glass vinyl ester polyurethane sandwich composites showed 1.63 to 2.48 MPa flaxural strength with 1.0-3.0 g/cc density (see, e.g. R. V. Rao et al. *Behavior of sandwich composites under flexural and fatigue loading: effect of variation of core density*. J. Eng. Sci. and Tech. (2011) 3 7598-7607). Sandwich composites of 5 mm thickness made out of glass/palmyra fiber waste using polyester resin showed 28 MPa tensile, 42.2 MPa flaxural strength, but the moisture absorption of the composite was more than 9% and also not a low-density materials [see, e.g. R. Velmurugan et al. *Mechanical properties of glass/pylmyara fiber waste. sandwich composites*, Indian J. Engg & Mater Sci. (2005) 12 563-570]. A comparison of density of our invented moisture resistant glossy finish green hybrid composites with other reported composite sheets are shown in FIG. 1 of drawing sheet. Manufacturing of such sandwich composites are time consuming, energy intensive, not simple process, expensive and the end products are not meeting the required quality to be used in the desired application especially for architectural interior in building and transport system. Very limited work have been reported universally on lightweight sandwich composites, however, such lightweight sandwich composites are ultra light and did not meet the required mechanical characteristics and consumer requirement and acceptability (see, e.g. P. Asokan et al. *Recent Advances on Fly ash Particulates and Biofiber Reinforced Lightweight Hybrid. Sandwich Composites*, Int. J. of. Engineering Research and Technology (2013) 2, 2914-2923; H. T. Draghicescu et al, *Thermomechanical Response of a Thin Sandwich Composite Structure*, Engineering Letters (2010) 18, 08; M. R. Doddamani, et al. *Compressive properties of sandwiches with functionally graded rubber core and jute-epoxy skins* Bull. Mater. Sci. (2013) 36, 319-328).

A reference may be made to work reported on the fly ash, sisal fibres reinforced epoxy resin based composite sheet (see, e.g. P. Asokan et al. *Towards sustainable micro and nano composites from fly ash and natural fibers for multifunctional applications*, Vacuum (2017) 146, 375-385); P. Asokan et al. *Recent Advances on Fly ash Particulates and Biofiber Reinforced Lightweight Hybrid Sandwich Composites*, Int. J. of. Engineering Research and Technology (2013) 2, 2914-2923), where a compression moulding techniques was used to fabricate the composite sheet, however, in reported work, fly ash composites sheet showed high density about 1.41 g/cc and low mechanical strength for fly-ash epoxy system. Moreover, no information was reported on water/moisture absorption and process parameter to fabricate moisture resistant composite sheet with variable density. Present invention deals with a simple process for fabrication of moisture resistant glossy finish high performance hybrid composite sheets using various types waste particulates such as marble waste, red mud, and waste arising from zinc and aluminium industries and natural chopped fibres/fabrics/textiles with epoxy resin/polyester and polyurethane resin system with variation of low density to high density (0.2-1.68 g/cc) and low water absorption (0.1-1.3%) also present invention describes a method for screen printing over the surface of composite sheets.

No simple process are available or developed by earlier researches universally for the development of moisture resistant and glossy finish composites in single operation/one stage production process. No work is reported for the development of lightweight composites with excellent surface finish, decorative finish, colors with good mechanical properties which has potential to use as an alternative to wood, plastic and FRP/GRP products for application as false ceiling, wall panels, partitions, furniture for building construction industry, consumer goods, architectural materials for transport system and other infrastructure development. So far, the reported and available technological innovation for making lightweight composites and process know how for manufacturing of such composites are not meeting the desired quality for wider range of applications. However, the present invention claims a simple process knowhow for the manufacturing of lightweight composites having a desired density varying from 0.22 g/cc to 1.68 g/cc. Furthermore, as per the requirement, the present invention provide know how process, by altering the fabrication conditions, raw materials quantity, concentration to achieve any specific required density, in the range between 0.22 g/cc of 1.68 g/cc, with glossy finish, excellent varying materials performance as a customized products to meet the consumer needs.

There were several constraints associated with composites developed earlier by many researchers, (i) the density was higher and (ii) composite did not showed good aesthetic properties/surface finish, (ii) materials did not meet required low water/moisture absorption (iii) materials did not meet all required mechanical properties and end user requirement and specifications, (iv) materials were not resistant to water/moisture and termite, (v) composite materials were not derived from the renewable/waste resources.

OBJECTIVE OF THE INVENTION

The main objective of the present invention is to make moisture/water resistance high-performance glossy finish hybrid green composites using industrial waste particulates, natural fibres/fabrics/textiles and various polymers and screen printing over the hybrid composites for multifunctional applications in wide spectrum as an alternative to timber, plastic and FRP/GRP products.

Another objective of the present invention is to fabricate lightweight and glossy finish composites useful for broad application spectrum as architectural materials, as false ceiling, partitions, wall panel, furniture, materials for construction of modular kitchen, work bench, instant house, building interiors, transport system (train, bus, car, ship, aircraft) and other infrastructure materials for use in airport, shopping complex, public utility centres.

Still another objective of the present invention is to find an alternative for the conventionally manufactured particle board, medium density fibre board, rice husk board, glass fibre composites, wood and other laminates being presently used as one of the major building components in interiors and exterior materials.

Another objective of the present invention is to gainfully utilize the different industrial wastes particulates (fly ash, mineral, mining, metallurgical, chemical and fertiliser industry wastes, marble and granite industry, FRP/GRP processing wastes) as filler, additives, catalyst, binder and as a surface finish components for the development of environmental friendly, moisture resistant with variable density glossy finish high performance hybrid green composites.

Another objective of the present invention is to recycle agro wastes particulates (wheat, paddy, baggage and other biomass residues) as additives, binder and as a surface finish and decorative components for the development of ultra lightweight hybrid green composites.

Another objective of the present invention is development moisture resistant glossy finish composites with density varying from 1.25 g/cc to 1.68 g/cc with its corresponding water absorption, thickness swelling tensile strength and tensile modulus in the range of 0.1-1.32%, 0.20-5.5%, 22-90 MPa, 2000-6500 MPa, respectively using waste particulates in epoxy resin system, with and without fibre incorporation under single operation.

Another objective of the present invention is to develop lightweight composites with density varying from 0.22 g/cc to 1.2 g/cc with its corresponding water absorption and thickness swelling, tensile strength, tensile modulus, in the range of 0.3 -1.3%, 0.2-5.3%, 6.5-35 MPa, 150- 3500 MPa, respectively using waste particulates in polyurethane binder system with and without fibre incorporation under single operation.

Yet another objective of the present invention is to develop lightweight, water resistance, termite and fungus free and glossy finish decorative composites in consumer goods, as an architectural interiors in locomotive application and other transport system.

Still, another object of the present invention is to develop lightweight and glossy finish green composites using one or more components stated above (fibres and particulates) with either epoxy resin/polyester resin or polyurethane binder system.

Still, another objective of the present invention is to develop lightweight and decorative green composites using short fibres or textile fibres reinforced epoxy resin/polyester resin or polyurethane binder system.

Yet, another objective of the present invention is to develop direct printing/laminating on the surface of moisture resistant glossy finish high strength decorative green composites, using industrial waste particulates (particulates arising from any type of waste stream) and/or natural fibres/fabrics reinforced with epoxy/polyester/polyurethane binder systems in making high performance moisture resistant composites for structural application.

SUMMARY OF THE PRESENT INVENTION

Manufacturing of composite materials from industrial waste particulates and renewable resources such as natural fibres/textiles and is one of the major challenges to meet the present and future demands of FRP/GRP products and wood-alternative materials. In the present invention, for manufacturing moisture/water resistance glossy finish green hybrid composites with variable density polymer composite sheet, the used reinforced materials are industrial waste particulates (such as solid or semi solid waste produced from thermal power plants such as fly ash, aluminium industry such as red mud, zinc, copper, iron, steel, manganese industries, process residues released during excavation of ores, mineral, coal, mining and waste arising from agricultural sector, fertiliser industry, chemical industry, granite, marble, stone industry such as marble, granite and stone wastes, FRP/GRP, asbestos and plastic industries) and natural fibres such glass fibre, sisal fibre, pine apple fibre, jute fibre, banana fibre, flax, cotton, hemp fibres and synthetics fabrics/textiles.

Present invention relates to a simple process for the manufacturing moisture resistant glossy finish hybrid composites particulates polymer composite sheet up to dimension of 220×120 cm with variable thickness, under single operation mode, using waste particulate such as mineral wastes, mining wastes, polymeric wastes, marble waste, polymeric waste ground residues, fly ash, chemical industry gypsum based waste, residues arising from secondary process of zinc, copper, aluminum ,smelters, agricultural green residues, burned residues reinforced with epoxy/polyester resin using compression moulding method under temperature varying from 16±2° C. to 75±2° C. and at varying casting pressure from 2-95 kg/cm² in single operation mode followed by hot air oven curing for 10-24 hr at 60-80° C. The resulted density of particulates polymer hybrid composites are from 1.25 g/cc to 1.68 g/cc with its corresponding water absorption of 0.1-1.26%, tensile strength and tensile modulus of 22-90 MPa and 250-6500 MPa, respectively.

Present invention relates to a simple process for the manufacturing high performance glossy finish hybrid composites fibres polymer composite sheet up to dimension of 220×120 cm with variable thickness, using natural chopped fibres such glass fibre, sisal fibre, pine apple fibre, jute fibre, banana fibre, flax, cotton, hemp fibres and synthetics fabrics/textiles reinforced with epoxy/polyester resin using compression moulding method under temperature varying from 16±2° C.-75±2° C. and at varying casting pressure from 2-95 kg/cm² in single operation mode followed by hot air oven curing for 10-24 hr at 60-105° C. The resulted density of particulates polymer hybrid composites are from 1.2 g/cc to 1.62 g/cc with its corresponding water absorption of 0.10-1.32%, tensile strength and tensile modulus of 28-105 MPa and 3260-6850 MPa respectively.

A novel process for making moisture resistant glossy finish high performance industrial waste particulates reinforced polymeric composites, fibres reinforced polymeric composite, fibres and particulate reinforced hybrid polymer composite with low water absorption in the range of 0.1- 1.32 and variable density from 0.2 to 1.68 g/cc, %, tensile strength in the range of 22-105 MPa and tensile modulus in range of 2450-8400 MPa, up to the dimension of 220 cm x 120 cm with varying thickness of 1.35 mm, 3 mm, 6 mm, 9 mm, 12 mm, and 19 mm, 25 mm, 30 mm and 50 mm and direct screen printing/laminating on the surface of hybrid composites sheet comprising;

a. dry and wet processing of industrial waste particulates such as marble waste, fly ash, lime and gypsum rich wastes mineral, metallurgical, chemical, fertiliser industry wastes, polymeric waste particulates.

b. dry and wet processing of chopped natural fibres, fabric/textile and synthetic fibres/textiles and hot air oven curing.

c. homogeneous mixing of industrial waste particulates and/or with chopped fibre in epoxy resin/polyester/polyurethane resin along with their catalyst and calendaring of fabric/textile along with their catalyst.

d. casting under compression moulding of composite sheet.

e. demoulding of glossy finish industrial waste particulates, fibres and fibres-particulate reinforced hybrid polymer composite sheet f. natural and/or hot air oven curing of composite sheet.

In yet another embodiment of the present invention, wherein industrial waste particulates selected from mineral wastes, mining wastes, polymeric wastes, marble waste, polymeric waste ground residues, fly ash, chemical industry gypsum based waste, residues arising from secondary process of zinc, copper, aluminum ,smelters, agricultural green residues, burned residues and natural fibre are selected from glass fibre, sisal fibre, pine apple fibre, jute fibre, banana fibre, flax, cotton, hemp fibres and synthetics fabrics/textiles.

In yet another embodiment of the present invention, wherein all types of industrial waste particulates and fibres are processed using hot water (~60° C.), mechanical grinding and hot air oven curing at 60 -80° C. for 12-24 hours, and final size of processed waste particulates are in the range of 2.0-75 μm, density of 0.85-1.87 g/cc, porosity of 30-68% and water holding capacity in range of 25 to 110%.

In yet another embodiment of the present invention, wherein all types of natural fibres are processed using hot water and hot air curing at 60-105° C. for 12-24 hours and their density are in range of 1.25-1.45 g/cc, elongation in range of 0.3-5.0%, tensile strength of 250-650 MPa and Young's modulus in range of 5-35 GPa.

In yet another embodiment of the present invention, wherein step a) industrial waste particulates (one or hybrid types) is used as filler in the volume of 50-80% in epoxy/polyester/polyurethane resin matrix to manufacture industrial waste particulates reinforced polymeric composites.

In yet another embodiment of the present invention, wherein step b) 15-40% of fibres or chopped fibres or textile (one or hybrid types) with size of 100 μm -5 cm is used in epoxy/polyester/polyurethane matrix system to manufacture fibres reinforced polymeric composites.

In yet another embodiment of the present invention, where in one or hybrid type of processed industrial particulates in the volume of 50-80% along with one or hybrid types processed fibres, fabrics/textiles are used in different volume of 5-35% are used for fabricating fibres-particulates reinforced polymeric composites.

In yet another embodiment of the present invention, where in epoxy polymer epoxy resin/polyester resin is used in the volume of 20-50% and methyl ethyl ketone peroxide (MEKP) and cobalt naphthenate were used as catalyst (2-5%) and in case of polyurethane resin, volume of 20-80% and poly-isocyanate as catalyst is used.

In yet another embodiment of the present invention wherein step c) is performed at grinding rate of 900-4000 rpm to manufacture glossy finish composite sheet.

In yet another embodiment of the present invention wherein step d) is performed by using compression moulding machine at varying temperature of 16±2° C.-75±2° C. and at varying casting pressure from 2 to 295 kg/cm² in single operation mode.

In yet another embodiment of the present invention wherein step e) performed by mechanical ejecting or automatic ejecting and step f) performed by hot air oven curing at 60-120° C. temperature for 12-24 hours to fabricate glossy finish particulate, fibre and fibre-particulates reinforced composite sheet.

In yet another embodiment of the present invention where in direct screen printing/laminating on the outer surface of moisture resistant glossy finish hybrid composites sheet is performed using transparent/semi transparent clear epoxy resin.

In yet another embodiment of the present invention where in composite sheets are used as active surface for the screen printing/laminating and pre-printed articles on papers, textiles, plastic, acrylic sheets or flexi are used for direct printing/laminating on the outer surface of glossy finish hybrid composite sheet In yet another embodiment of the present invention wherein in compression moulding machine is used for screen printing/laminating at varying temperature from 25±2° C. to 120±2° C. and at varying casting pressure from 22 to 295 kg/cm² .

In yet another embodiment of the present invention wherein mechanical ejecting or automatic ejecting is performed for demoulding and curing of screen printed/laminated hybrid composite sheet is performed by hot air oven curing at 60-120° C. temperature for 12-24 hours.

Present invention relates to a simple process for the manufacturing high performance glossy finish hybrid composites particulates-fibres polymer composite sheet up to dimension of 220×120 cm with variable thickness, using wastes particulate such as mineral wastes, mining wastes, polymeric wastes, marble waste, polymeric waste ground residues, fly ash, chemical industry gypsum based waste, residues arising from secondary process of zinc, copper, aluminum ,smelters, agricultural green residues, burned residues along with natural chopped fibres such glass fibre, sisal fibre, pine apple fibre, jute fibre, banana fibre, flax, cotton, hemp fibres and synthetic fabrics/textiles with epoxy/polyester resin using compression moulding method under temperature varying from 16±2° C. to 75±2° C. and at varying casting pressure from 2 to 95 kg/cm² in single operation mode followed by hot air oven curing for 10-24 hr at 60-105° C. The resulted density of particulates-fibres polymer hybrid composites are varying from 1.25 g/cc to 1.68 g/cc with its corresponding water absorption of 0.10-1.30%, tensile strength and tensile modulus of 22-105 MPa and 2000-6500 MPa, respectively.

DETAILED DESCRIPTION OF THE INVENTION

Figure 1:
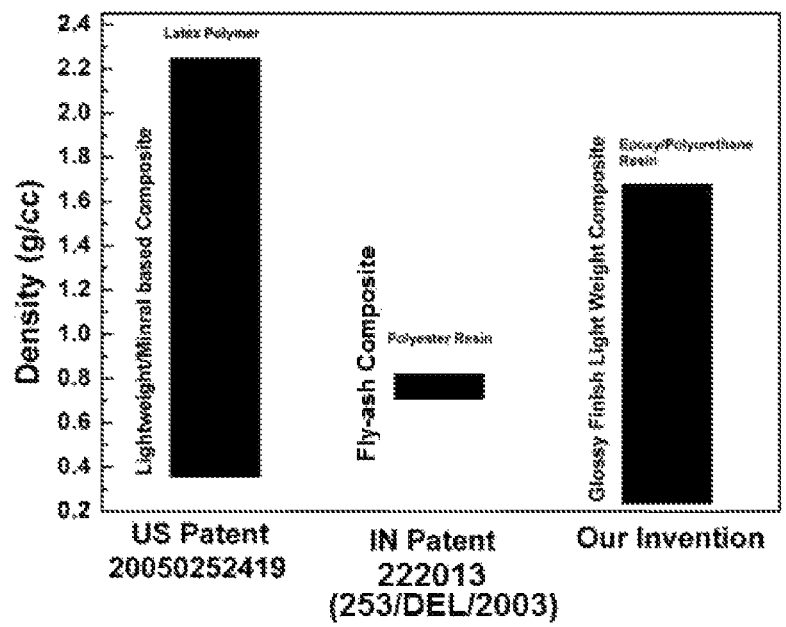
FIG. 1 represents a comparison of density of our invented moisture resistant glossy finish green PRPC/FPRPC sandwich composite sheet with other reported composite sheet
Figure 2:
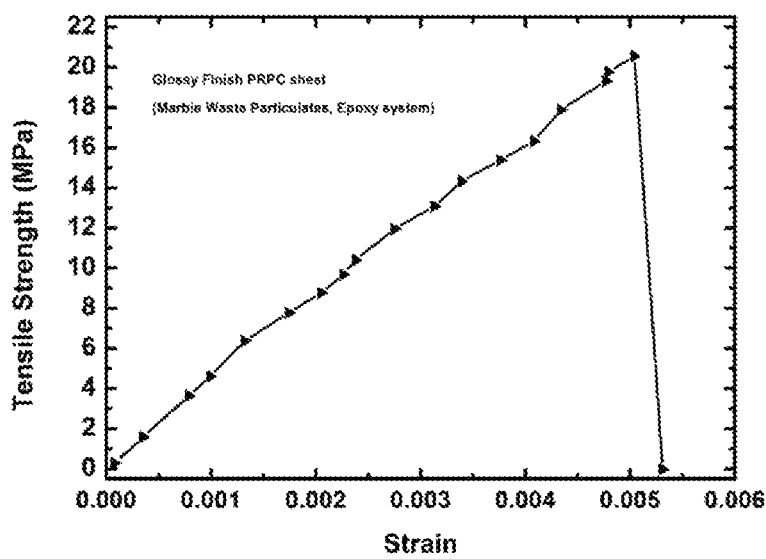
FIG. 2 represents a tensile stress-strain curves of glossy finish particulates reinforced polymer composite (PRPC) sheets [marble waste and epoxy resin]
Figure 3:
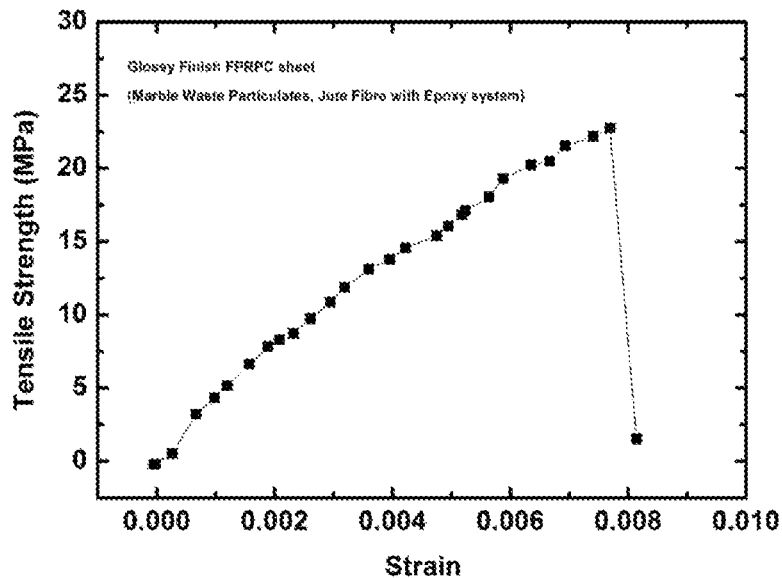
FIG. 3 represents a tensile stress-strain curves of glossy finish particulates fibre reinforced polymer composite (FPRPC) sheets [marble waste, jute fibre and epoxy resin]

Present invention deals with a simple process for the manufacturing low density and glossy finish composites under single operation, wherein the density of the composites fabricated using industrial waste particulates (20-80%) with or without fibre reinforcement (2-15%) in polyurethane binder system exhibits as low as 0.22 g/cc to 1.2 g/cc density with its corresponding tensile strength and tensile modulus 6.5-35 MPa and 150-3500 MPa respectively. Moreover, the hybrid green composite fabricated under one stage operation using epoxy resin/polyester resin with natural fibre (2-15%)/waste particulates (20-80%) reinforced or in combination of natural fibres and particulates reinforced glossy finish/decorative composites resulted a density ranging from 0.2 to 1.68 g/cc with its corresponding water absorption from 0.1 to 1.3%, tensile strength, tensile modulus the range of 22-105 MPa, 2000-6850 MPa, respectively. FIG. 2 shows tensile stress-strain curves of glossy finish particulates reinforced polymer green hybrid composite sheets prepared by marble waste and epoxy resin. FIG. 3 shows the tensile stress-strain curves of glossy finish particulates fibre reinforced green hybrid composite sheets prepared by marble waste, jute fibre and epoxy resin.

Present invention relates to a simple process for the manufacturing moisture resistant glossy finish hybrid composites particulates polymer composite sheet up to dimension of 220×120 cm with variable thickness, under single operation mode, using waste particulate such as mineral wastes, mining wastes, polymeric wastes, marble waste, polymeric waste ground residues, fly ash, chemical industry gypsum based waste, residues arising from secondary process of zinc, copper, aluminum, smelters, agricultural green residues, burned residues reinforced with epoxy/polyester resin using compression moulding method under temperature varying from 16±2° C. to 75±2° C. and at varying casting pressure from 2 to 95 kg/cm$^2$ in single operation mode followed by hot air oven curing for 10-24 hr at 60-80° C. The resulted density of particulates polymer hybrid composites are from 1.25 g/cc to 1.68 g/cc with its corresponding water absorption of 0.1-1.26%, tensile strength and tensile modulus of 22-90 MPa and 250-6500 MPa, respectively.

Present invention relates to a simple process for the manufacturing high performance glossy finish hybrid composites fibres polymer composite sheet up to dimension of 220×120 cm with variable thickness, using natural chopped fibres such glass fibre, sisal fibre, pine apple fibre, jute fibre, banana fibre, flax, cotton, hemp fibres and synthetics fabrics/textiles reinforced with epoxy/polyester resin using compression moulding method under temperature varying from 16±2° C. to 75±2° C. and at varying casting pressure from 2 to 95 kg/cm$^2$ in single operation mode followed by hot air oven curing for 10-24 hr at 60-105° C. The resulted density of particulates polymer hybrid composites are from 1.2 g/cc to 1.62 g/cc with its corresponding water absorption of 0.10-1.32%, tensile strength and tensile modulus of 28-105 MPa and 3260-6850 MPa respectively.

The raw materials in making such composites are available substantially from different industrial operation. These composites can be made either with particulates or with particulates and fibres under injection moulding system or compression moulding system in closed mould. It is possible to make specific components of desired shape, dimension under injection moulding system too. The potential applications of composites are architectural interiors in building construction sector and transport system including locomotives (rail coach sleeper bed plank, interiors, seat back board, support panels, flooring, false ceiling and partition panels, toilet doors and panels). Findings of the work done potentially exploit the use of unutilised plant fibres as partial substitute to glass fibre or other synthetic fibres in composites as engineering materials.

Use of cellulosic fibre in polymer composites have shown considerable progress in recent years due to many technical and social advantages as it exhibits lightweight, biodegradable and renewable in nature. Nevertheless, the composite's characteristics depend on many factors such as fibre and matrix system, performance of individual components and their interfacial compatibility. Among cellulosic fibres, use of jute, hemp and flax fibres are more pronounced. Though, there is wide variation in the physical, chemical and mechanical properties of different cellulosic fibres, jute fibre is found to be one of the promising cellulosic fibre, has better utility as a reinforcing medium beyond its traditional utility as ropes, carpets, mats, toys, bags, envelopes etc. India is one of the world's leading jute producers and the annual production of jute fibre is more than 2 million tonnes. Industrial waste particulates are naturally wasted resource which has potential for use as a reinforcing particulates and filler and catalyst in polymer matrix composites. Universally, more than 20 billion tons of such waste particulates have been annually produced and India alone produces about one billion tonnes of solid wastes during 2014-2015.

Wide range of industrial waste particulates used in the present invention consists of 60-95% silt and clay sized particles and the particle size varied from 5-85 μm. The chemical composition present in the wide range of particulates were oxides of silica (3.5-65%), alumina (0.5-15%), iron (0.2-58%), calcium (0.2-28%), magnesium (0.15-4.2%), copper (0.35-4%), sulphur (0.1-14%) with low concentration (below 1.5%) of other constituents such as, zinc, chromium, cobalt, nickel lead. Physical and chemical characteristics of industrial waste particulates are as shown in Table 1 and Table 2. Mechanical properties of fibres such as jute, sisal, and glass and jute fabric are given in Table 3.

TABLE 1

Physical characteristics of industrial waste particulates

| | | Physical Property | | | | |
|---|---|---|---|---|---|---|
| S. No | Physical properties | Fly ash | Marble wastes | Red Mud | Jarosite waste | Granite Waste |
| 1 | Particle size (μm) | 5-200 | 10-150 | 5-150 | 2-75 | 10-150 |
| 2 | Bulk density (g/cc) | 0.85-1.60 | 1.0-1.85 | 1.2-1.8 | 0.98-1.4 | 1.15-1.85 |
| 3 | Specific gravity | 2.0-2.8 | 2.0-2.8 | 2.2-3.4 | 2.2-2.95 | 1.7-2.6 |

TABLE 1-continued

Physical characteristics of industrial waste particulates

| | | Physical Property | | | | |
|---|---|---|---|---|---|---|
| S. No | Physical properties | Fly ash | Marble wastes | Red Mud | Jarosite waste | Granite Waste |
| 4 | Porosity (%) | 30-65 | 35-50 | 45-65 | 40-75 | 35-65 |
| 5 | pH | 4.5-12 | 6-9.5 | 4-12.5 | 4.0-9.5 | 6.5-9.5 |
| 6 | Electrical conductivity (μmohs/HP) | 250-850 | 200-900 | 450-800 | 8500-13597 | 730-24000 |
| 7 | Specific surface area (HP$^2$/g) | >1000 | >1100 | >1200 | >900 | >1200 |
| 8 | Waterholding capacity (%) | <55 | <50 | <45 | <85 | <65 |

TABLE 2

Chemical characteristics of industrial waste particulates

| | Chemical | Compositions (%) | | | |
|---|---|---|---|---|---|
| S. No | Components | Fly ash | Marble wastes | Red Mud | Jarosite |
| 1 | $SiO_2$ | 40-60 | 05-10 | 02-12 | 3.5-6.5 |
| 2 | $Fe_2O_3$ | 04-10 | 0.1-02 | 10-45 | 45-58 |
| 3 | $Al_2O_3$ | 08-35 | 0.5-05 | 5-20 | 2.2-3.5 |
| 4 | CaO | 01-10 | 30-60 | 3-10 | 5.0-7.5 |
| 5 | MgO | 0.1-05 | 2-10 | <01 | 1.2-2.5 |
| 6 | $K_2O$ | 0.1-02 | <0.5 | <0.5 | 0.5-1.2 |
| 7 | ZnO | 0.1-03 | <0.1 | <0.5 | 4.8-12 |
| 8 | CuO | <0.5 | <0.2 | <0.3 | <1.11 |
| 9 | PbO | <0.2 | <0.1 | <0.2 | 1.2-2.4 |
| 10 | Loss on Ignition | 10 | 30-60 | 10 | — |

TABLE 3

Mechanical properties of fibres such as jute, sisal, and glass and jute fabric

| S. N | Parameters | Jute | Sisal | Glass | Jute Fabric |
|---|---|---|---|---|---|
| 1 | Density g/cc | 1.25-1.45 | 1.3-1.45 | 2.56 | 2.51 |
| 2 | Elongation (%) | 1.5-5.0 | 0.3-.75 | 4.5 | 19.27 ± 2.81 |
| 3 | Tensile strength (MPa) | 300-650 | 250-650 | 2000 | 18.07 ± 1.30 |
| 4 | Young's modulus (GPa) | 5-35 | 5.5-22.5 | 73.0 | 0.2 ± 0.01 |

Results revealed from the present invention that the moisture/water resistance lightweight composites reinforced with particulates with polyurethane binder system showed the density varying from 0.22 g/cc to 1.2 g/cc. The resultant tensile and tensile modulus was 6.5-35 MPa and 150-3500 MPa respectively. Incorporation of particulates enhanced the tensile strength and tensile modulus of composites as compared to without particulate reinforcement. It is apparent that particulates and fibre reinforced composite resulted in further low density composites with better mechanical properties. The internal surface of the tensile fractured sample studied by Scanning Electron Microscopic showed good interfacial bonding between polyurethane micro-balloons and particulates. It is evident from the extensive research that the presence of silica and alumina and other constituents in the particulates together with the cellulosic content in bio-fibre enhanced the interfacial adhesion resulting improved mechanical properties.

The findings of the present study showed significant improvement in the water absorption, mechanical properties of low density composites as compared to the work reported by others which influence the light and stiff components for potential application as architectural interior in building and transport system. The utility of the concept developed in the present invention opened an avenue to potentially exploit the unutilised waste particulates and fibres in replacing glass fibers and other petroleum based fibres and composites.

The moisture/water resistance glossy finish composites has tremendous scope in wide range of applications such as partition, false ceiling, non load bearing walls as a architectural panels/partitions in construction industries, automotive and locomotive sectors. The potential application of these lightweight composites in locomotive applications includes: coach berth panels, seat support panels, doors, false ceiling and roofing panels, partition, window frame and furniture. Furthermore, these composites are free from insects, fungus, termite, and moisture absorption and corrosion attack. The present invention has significant role for commercial exploitation in composite industry for sustainable development.

In an embodiment of the present invention, the glossy finish moisture/water resistance high performance composite's fabricated using waste particulate/fibre reinforced with epoxy resin system resulted density from 1.25 g/cc to 1.68 g/cc with its corresponding moisture/water absorption from 0.1 to 1.3%, tensile strength and tensile modulus 22-90 MPa and 250-6500 MPa, respectively. These composites can be made either with particulates or with particulates and fibres under compression moulding system either in open moulds or closed mould system. It is possible to make specific components of desired shape, dimension under injection moulding system too. The potential applications of composites are architectural interiors in building construction sector and transport system including locomotives (rail coach sleeper bed plank, interiors, seat back board, support panels, flooring, false ceiling and partition panels, toilet doors and panels) and as skin materials for making sandwich structure. Findings of the work done potentially exploit the use of unutilised waste resources and plant fibres or other synthetic fibres in composites as engineering materials.

The novelty of the present invention is for making lightweight with variable density and glossy finish polymer matrix composites as well as glossy finish high strength composites sheet with water resistant termite free waste particulates and natural fibres reinforced composites sheets which are useful for multiple applications spectrum as alternative materials to timber, plastic and FRP/GRP products/materials.

EXAMPLES

Following examples are given by way of illustration and therefore should not be construed to limit the scope of the invention.

Example-1

Glossy Finish Particulate Reinforced Hybrid Polymer Composite (PRPC) Sheets Using Epoxy Resin Raw Materials: Industrial waste particulates (mineral wastes, mining wastes, polymeric wastes, marble waste, polymeric waste ground residues, fly ash, chemical industry gypsum based waste, residues arising from secondary process of zinc, copper, aluminum, smelters, agricultural green residues, burned residues) were used as reinforced materials. Polymer used to make glossy finish sheet was commercial grade epoxy/polyester resin. Methyl ethyl ketone peroxide (MEKP) and cobalt naphthenate were used as catalyst. Industrial waste particulates used in these glossy finish green hybrid composites have particle size in range of 2.0-75 μm, density of 0.85-1.87 g/cc, porosity of 30-68% and water holding capacity in range of 25 to 110%.

Figure 4:
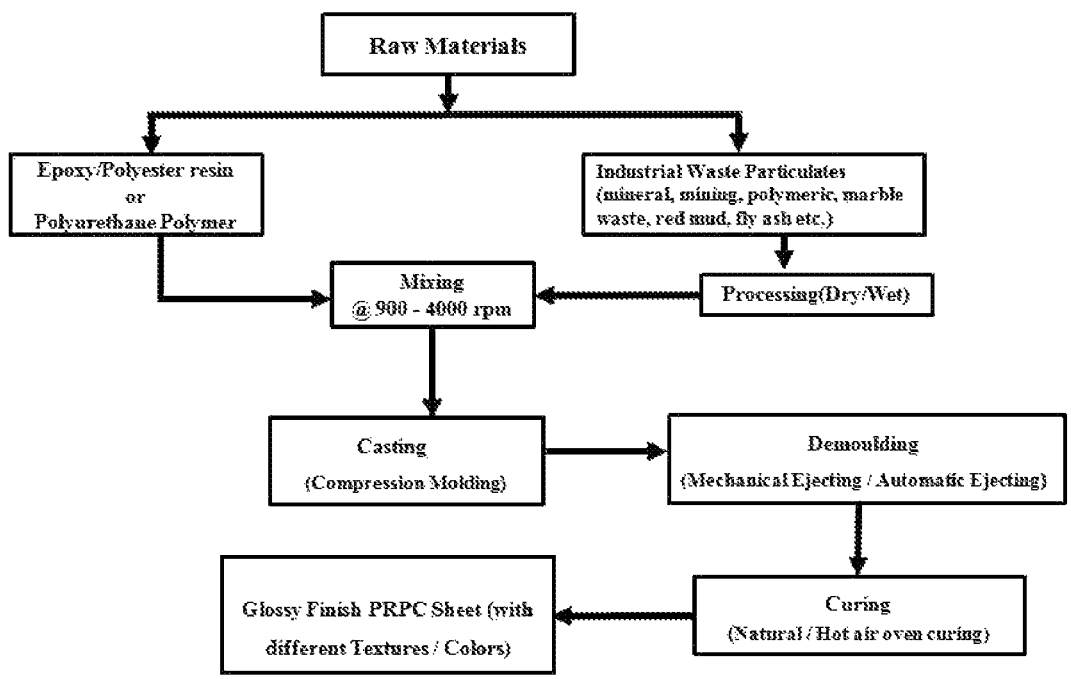
FIG. 4 represents an explanatory view showing the manufacturing process of the moisture/water resistance glossy finish particulates reinforced polymer composite (PRPC) sheets in single operation mode.

Process: Detailed laboratory experimental programme was conducted where in wide range of industrial waste particulates (mineral wastes, mining wastes, polymeric wastes, marble waste, polymeric waste ground residues, fly ash, chemical industry gypsum based waste, residues arising from secondary process of zinc, copper, aluminum, smelters, agricultural green residues, burned residues)were processed and 50-80% of wastes were used alone (any one type of waste particulates in one sheet) and they were homogeneously mixed with the epoxy/polyester resin based binder system using mechanical stirrer at room temperature and methyl ethyl ketone peroxide (MEKP) and cobalt naphthenate were used as catalyst (2-5%). A compression moulding machine was used to fabricate the glossy finish particulate reinforced polymer composite (PRPC) sheet. Casting and fabrication of the composite sheet was done at varying temperature of 16±2° C.-75±2° C. and at varying casting pressure from 2 to 95 kg/cm$^2$ in single operation mode. The fabricated glossy finish PRPC sheets were cured in an oven at 60-120° C. for 12-24 hours. Pigment of about 0.2 to 0.5% of epoxy resin/polyester resin is used creates colour in composite sheet. Different thickness (1.35 mm, 3 mm, 6 mm, 9 mm,12 mm, and 19 mm, 25 mm, 30 mm and 50 mm) of glossy finish PRPC sheets were fabricated. In lab scale experiment, size of the fabricated PRPC sheets was 32×22 cm. Up- scaling of glossy finish PRPC sheets was also done glossy finish PRPC up to the dimension of 220 cm×120 cm with varying thickness of 1.35 mm, 3 mm, 6 mm, 9 mm, 12 mm, and 19 mm) were fabricated (FIG. 4).

Properties: The following are the some of the measured properties of above described glossy finish industrial wastes based PRPC sheets:
Density: 1.30-1.68 g/cc; Water Absorption: 0.10-1.26%
Thickness Swelling: 0.28-4.2%; Tensile Strength: 22-88 MPa
Tensile Modulus: 2900-3340 MPa

Example-2

Glossy Finish Fibre Reinforced Hybridpolymer Composite (FRPC) Sheets Using Epoxy Resin Raw Materials: Fibres such as glass fibre, sisal fibre, pine apple fibre, jute fibre, banana fibre, flax, cotton, hemp fibres were used as reinforced materials. Commercial grade bi-directional jute fabric [grams per square metre (GSM) of about 300 GSM] and chopped fabric with size of 2.0-45 mm were used. The polymer used to make glossy finish sheet was commercial grade epoxy/polyester resin. Methyl ethyl ketone peroxide (MEKP) and cobalt naphthenate were used as catalyst. Fibers used to fabricate glossy finish fibre reinforced composites have density in range of 1.25-1.45 g/cc, elongation in range of 0.3-5.0%, tensile strength of 250-650 MPa and Young's modulus in range of 5-35 GPa.

Figure 5:
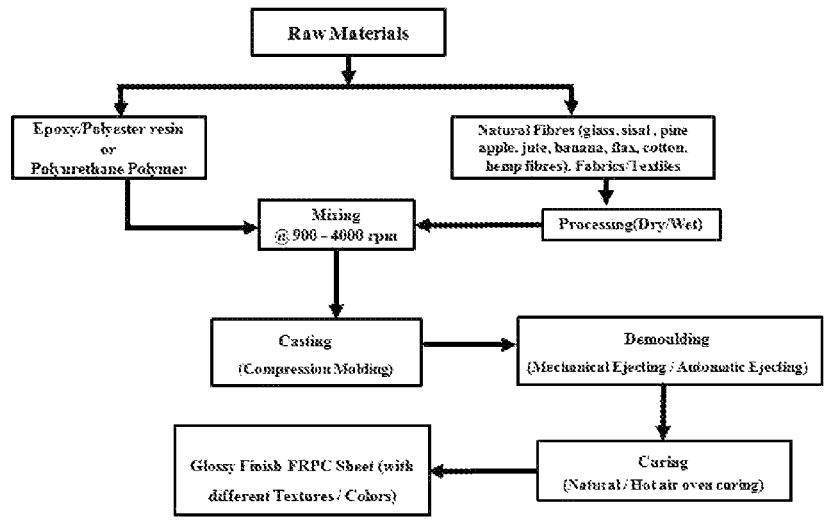
FIG. 5 represents an explanatory view showing the manufacturing process of the high performance moisture/water resistance glossy finish natural fibres reinforced polymer composite (FRPC) sheets in single operation mode.

Process: Detailed laboratory experimental programme was conducted where in wide range of fibres (e.g. glass fibre, sisal fibre, pine apple fibre, jute fibre, banana fibre, flax, cotton, hemp fibres) were chemically processed and 15-40% of fibres or chopped fibres/textile with size of 100 μm-5 cm were used alone (any one type of chopped fibre in one sheet) and then it was homogeneously mixed with the epoxy/polyester resin based binder system using mechanical stirrer at room temperature and methyl ethyl ketone peroxide (MEKP) and cobalt naphthenate were used as catalyst (2-5%). Calendaring of fabric/textile sheet was done over chopped natural fibres reinforced composite sheet A compression moulding machine was used to fabricate the glossy finish fibres reinforced polymer composite (FRPC) sheet. Casting and fabrication of the composite sheet was done at varying temperature of 16±2° C.-75±2° C. and at varying casting pressure from 2 to 95 kg/cm$^2$ in single operation mode. The fabricated glossy FRPC sheets were cured in an oven at 60-120° C. for 12-24 hours. Pigment of about 0.2 to 0.5% of epoxy resin/polyester resin is used creates colour in composite sheet. Different thickness (1.35 mm, 3 mm, 6 mm, 9 mm, 12 mm, and 19 mm, 25 mm, 30 mm and 50 mm) of glossy finish FRPC sheets were fabricated. In lab-scale experiment, size of the fabricated FRPC sheets was 32×22 cm. Up- scaling of glossy finish FRPC sheets was also done and glossy finish FRPC up to the dimension of 220 cm×120 cm with varying thickness of (1.35 mm, 3 mm, 6 mm, 9 mm,12 mm, and 19 mm, 25 mm, 30 mm and 50 mm) were fabricated (FIG. 5).

Properties: The following are the some of the measured properties of above described glossy finish FRPC sheets:
Density: 1.2-1.62 g/cc; Water Absorption: 0.10-1.32%)
Thickness Swelling: 0.22-5.5%; Tensile Strength: 28.00-105.00 MPa
Tensile Modulus: 3260-6850 MPa

Example-3

Glossy Finish Particulate Fibre Reinforced Hybrid Polymer Composite (PFRPC) Sheets Using Epoxy Resin Raw Materials: Industrial waste particulates (mineral wastes, mining wastes, polymeric wastes, marble waste, polymeric waste ground residues, fly ash, chemical industry gypsum based waste, residues arising from secondary process of zinc, copper, aluminum ,smelters, agricultural green residues, burned residues) were used as reinforced materials. Polymer used to make glossy finish sheet was commercial grade epoxy/polyester resin. Methyl Ethyl Ketone Peroxide (MEKP) and cobalt naphthenate were used as catalyst. Industrial waste particulates used in these glossy finish green hybrid composites have particle size in range of 2.0-75 μm, density of 0.85-1.87 g/cc, porosity of 30-68% and water holding capacity in range of 25 to 110%. Fibers used in these glossy finish green fibre reinforced composites have density in range of 1.25-1.45 g/cc, elongation in range of 0.3 - 5.0%, tensile strength of 250-650 MPa and Young's modulus in range of 5-35 GPa.

Figure 6:
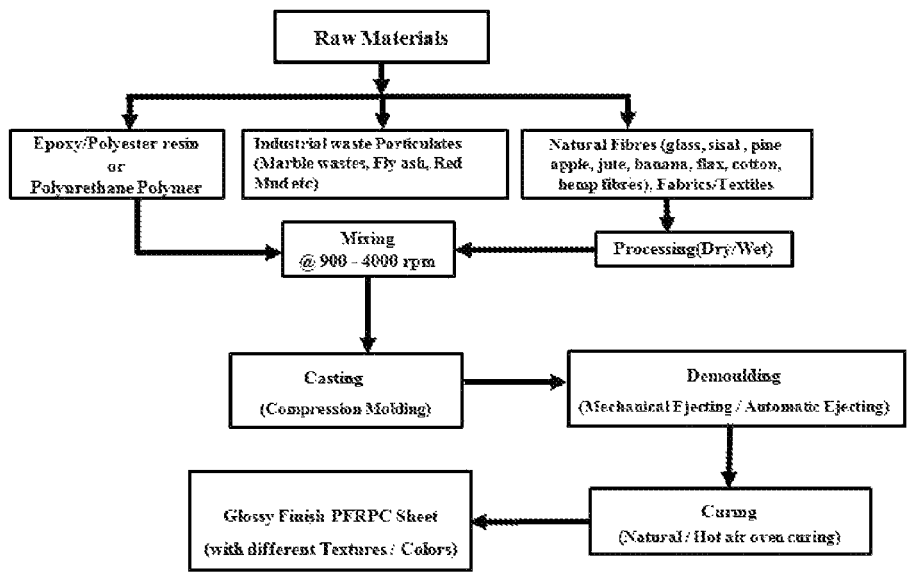
FIG. 6 represents an explanatory view showing the manufacturing process of the moisture/water resistance glossy finish fibres particulates reinforced polymer composite (FPRPC) sheets in single operation mode.

Process: Detailed laboratory experimental programme was conducted where in wide range of industrial waste particulates (mineral wastes, mining wastes, polymeric wastes, marble waste, polymeric waste ground residues, fly ash, chemical industry gypsum based waste, residues arising from secondary process of zinc, copper, aluminum, smelters, agricultural green residues, burned residues) were processed and 50-80% of alone or hybridization with other industrial wastes were used (one or in combination of two or more than two types of waste particulates). Similarly, a wide range of fibres (e.g. glass fibre, sisal fibre, pine apple fibre, jute fibre, banana fibre, flax, cotton, hemp fibres) were chemically processed and 5-35% ratio of fibre or chopped fibres/textile with size of 100 µm-5 cm were used alone (any one type of chopped fibre in one sheet) and then both (particulates and fibres) were homogeneously mixed with the epoxy/polyester resin based binder system using mechanical stirrer at room temperature and methyl ethyl ketone peroxide (MEKP) and cobalt naphthenate were used as catalyst (2-5%). Calendaring of fabric/textile sheet was done over chopped natural fibres reinforced composite sheet. A compression moulding machine was used to fabricate the glossy finish fibres particulate reinforced polymer composite (FPRPC) sheet. Casting and fabrication of the composite sheet was done at varying temperature of 16±2° C.-75±2° C. and at varying casting pressure from 2-95 kg/cm$^2$ in single operation mode. The fabricated glossy finish FPRPC sheets were cured in an oven at 60-120° C. for 12-24 hours. Pigment of about 0.2 to 0.5% of epoxy resin/polyester resin is used creates colour in composite sheet. Different thickness (1.35 mm, 3 mm, 6 mm, 9 mm, 12 mm, and 19 mm, 25 mm, 30 mm and 50 mm) of glossy finish FPRPC sheets were fabricated. In lab scale experiment, size of the fabricated FPRPC sheets was 32×22 cm$^2$. Up-scaling of glossy finish FPRPC sheets was also done glossy finish FPRPC up to the dimension of 220 cm×120 cm with varying thickness of 1.35 mm, 3 mm, 6 mm, 9 mm, 12 mm, and 19 mm, 25 mm, 30 mm and 50 mm) were fabricated (FIG. 6).

Properties: The following are the some of the measured properties of above described glossy finish industrial wastes based PFRPC sheets:

Density: 1.25-1.65 g/cc; Water Absorption: 0.10-1.3%; Thickness Swelling: 0.28-5.0%

Tensile Strength: 25-90 MPa; Tensile Modulus: 2950-6200 MPa

Example-4

Glossy Finish Particulate-Fibre Reinforced Polymer Composite (PFRPC) Sheets Using Epoxy Resin: (With One Type of Particulates and Alone/Hybrid Fibres)

Raw Materials: Industrial waste particulates (mineral wastes, mining wastes, polymeric wastes, marble waste, polymeric waste ground residues, fly ash, chemical industry gypsum based waste, residues arising from secondary process of zinc, copper, aluminum, smelters, agricultural green residues, burned residues) were used as reinforced materials. Fibres such as glass fibre, sisal fibre, pine apple fibre, jute fibre, banana fibre, flax, cotton, hemp fibres were used as reinforced materials. Commercial grade bi-directional jute fabric [grams per square metre (GSM) of about 300 GSM] and chopped fabric with size of 100 µm-5 cm were used. Polymer used to make glossy finish sheet was commercial grade epoxy/polyester resin. Methyl ethyl ketone peroxide (MEKP) and cobalt naphthenate were used as catalyst. Industrial waste particulates used in these glossy finish green hybrid composites have particle size in range of 2.0-75 µm, density of 0.85-1.87 g/cc, porosity of 30-68% and water holding capacity in range of 25 to 110%. Fibers used in these glossy finish green fibre reinforced composites have density in range 1.25-1.45 g/cc, elongation in range of 0.3-5.0%, tensile strength of 250-650 MPa and Young's modulus in range of 5-35 GPa.

Process: Detailed laboratory experimental programme was conducted where in wide range of industrial waste particulates (mineral wastes, mining wastes, polymeric wastes, marble waste, polymeric waste ground residues, fly ash, chemical industry gypsum based waste, residues arising from secondary process of zinc, copper, aluminum, smelters, agricultural green residues, burned residues) were processed and 50-80% of wastes were used as alone (one type of waste particulates in one sheets). Similarly, a wide range of fibres (e.g. glass fibre, sisal fibre, pine apple fibre, jute fibre, banana fibre, flax, cotton, hemp fibres) were chemically processed and 5-35% ratio of fibre or chopped fibres/textile with size of 100 µm-5 cm were used alone (any one type of chopped fibre in one sheet), and then both (particulates and fibers) were homogeneously mixed with the epoxy resin based binder system using mechanical stirrer at room temperature and methyl ethyl ketone peroxide (MEKP) and cobalt naphthenate were used as catalyst (2-5%). Calendaring of fabric/textile sheet was done over chopped natural fibres reinforced composite sheet. A compression moulding machine was used to fabricate the glossy finish particulate fibres reinforced polymer composite (FPRPC) sheet. Casting and fabrication of the composite sheet was done at varying temperature of 16±2° C.-75±2° C. and at varying casting pressure from 2-95 kg/cm$^2$ in single operation mode. The fabricated glossy finish PFRPC sheets were cured in an oven at 60-80° C. for 12-24 hours. Pigment of about 0.2 to 0.5% of epoxy resin/polyester resin is used creates colour in composite sheet. Different thickness (1.35 mm, 3 mm, 6 mm, 9 mm, 12 mm, and 19 mm, 25 mm, 30 mm and 50 mm) of glossy finish FPRPC sheets were fabricated. In lab scale experiment, size of the fabricated PFRPC sheets was 32×22 cm. Up-scaling of glossy finish PFRPC sheets was also done glossy finish PFRPC up to the dimension of 220 cm×120 cm with varying thickness of 1.35 mm, 3 mm, 6 mm, 9 mm, 12 mm, and 19 mm, 25 mm, 30 mm and 50 mm) were fabricated (FIG. 6).

Properties: The following are the some of the measured properties of above described glossy finish industrial wastes based PFRPC sheets:

Density: 1.25-1.68 g/cc; Water Absorption: 0.10-1.26%; Thickness Swelling: 0.28-5.5%

Tensile Strength: 22.00-40.00 MPa; Tensile Modulus: 2000-6500 MPa

Example 5

Glossy Finish Particulate Fibre Reinforced Polymer Composite (PFRPC) Sheets Using Epoxy Resin: (Using Hybrid Types of Particulates With Alone/Hybrid Fibres)

Raw Materials: Industrial waste particulates (mineral wastes, mining wastes, polymeric wastes, marble waste, polymeric waste ground residues, fly ash, chemical industry gypsum based waste, residues arising from secondary process of zinc, copper, aluminum, smelters, agricultural green residues, burned residues) were used as reinforced materials. Fibres such as glass fibre, sisal fibre, pine apple fibre, jute fibre, banana fibre, flax, cotton, hemp fibres were used as reinforced materials. Commercial grade bi-directional jute fabric [grams per square metre (GSM) of about 300 GSM] and chopped fabric with size of 2.0-45 mm were used. Polymer used to make glossy finish sheet was commercial grade epoxy/polyester resin. Methyl ethyl ketone peroxide (MEKP) and cobalt naphthenate were used as catalyst. Industrial waste particulates used in these glossy finish green hybrid composites have particle size in range of 2.0-75 μm, density of 0.85-1.87 g/cc, porosity of 30-68% and water holding capacity in range of 25 to 110%. Fibers used in these glossy finish green fibre reinforced composites have density in range of 1.25-1.45 g/cc, elongation in range of 0.3-5.0%, tensile strength of 250-650 MPa and Young's modulus in range of 5-35 GPa.

Process: Detailed laboratory experimental programme was conducted where in wide range of industrial waste particulates(mineral wastes, mining wastes, polymeric wastes, marble waste, polymeric waste ground residues, fly ash, chemical industry gypsum based waste, residues arising from secondary process of zinc, copper, aluminum ,smelters, agricultural green residues, burned residues) were processed and 50-80% of hybrid wastes were used (one or in combination with two or more type of waste particulates in one sheet). Similarly, a wide range of fibres (e.g. glass fibre, sisal fibre, pine apple fibre, jute fibre, banana fibre, flax, cotton, hemp fibres) were chemically processed and 5-35% ratio of fibre or chopped fibres/textile with size of 100 μm-5 cm were used alone or hybridization with other fibers (one type or in combination of 2 or more types of chopped fibre in one sheets) and then both (particulates and fibers) were homogeneously mixed with the epoxy based binder system using mechanical stirrer at room temperature. A compression moulding machine was used to fabricate the glossy finish particulate fibres reinforced polymer composite (PFRPC) sheet. Casting and fabrication of the composite sheet was done at varying temperature of 16±2° C.-75±2° C. and at varying casting pressure from 2-95 kg/cm² in single operation mode. The fabricated glossy finish PFRPC sheets were cured in an oven at 60-120° C. for 12-24 hours. Pigment of about 0.2 to 0.5% of epoxy resin/polyester resin is used creates colour in composite sheet. Different thickness (1.35 mm, 3 mm, 6 mm, 9 mm, 12 mm, 19 mm, 25 mm, 30 mm and 50 mm) of glossy finish FPRPC sheets were fabricated. In lab scale experiment, size of the fabricated FPRPC sheets was 32×22 cm. Up- scaling of fabricated sheets was also done glossy finish FPRPC up to the dimension of 220 cm×120 cm with varying thickness of 1.35 mm, 3 mm, 6 mm, 9 mm, 12 mm, 19 mm, 25 mm, 30 mm and 50 mm) were fabricated (FIG. 6).

Properties: The following are the some of the measured properties of above described glossy finish industrial wastes based PFRPC sheets:

Density: 1.25-1.68 g/cc; Water Absorption: 0.10-1.26%; Thickness Swelling: 0.28-5.5%

Tensile Strength: 23.50-88.00 MPa; Tensile Modulus: 2500-6250 MPa

Example 6

Glossy Finish Lightweight Particulate Reinforced Polymer Composite (PRPC) Sheets Using Polyurethane Resin Raw Materials: Industrial waste particulates (mineral wastes, mining wastes, polymeric wastes, marble waste, polymeric waste ground residues, fly ash, chemical industry gypsum based waste, residues arising from secondary process of zinc, copper, aluminum, smelters, agricultural green residues, burned residues) were used as reinforced materials. Polymer used to make glossy finish sheet was commercial grade polyurethane resin. Poly-isocyanate is used as catalyst was used as catalyst. Industrial waste particulates used in these glossy finish green hybrid composites have particle size in range of 2.0-75 μm, density of 0.85-1.87 g/cc, porosity of 30-68% and water holding capacity in range of 25 to 110%.

Process: Detailed laboratory experimental programme was conducted where in wide range of industrial waste particulates(mineral wastes, mining wastes, polymeric wastes, marble waste, polymeric waste ground residues, fly ash, chemical industry gypsum based waste, residues arising from secondary process of zinc, copper, aluminum ,smelters, agricultural green residues, burned residues) were processed and 50-80% of wastes were used alone or hybridization with other waste particulates (one type or in combination with two or more waste particulates in one sheet) and then both (particulates and fibre) were homogeneously mixed with the polyurethane based binder system using mechanical stirrer at room temperature. Poly-isocyanate is used as catalyst in the range of 2-5% was used as catalyst. A compression moulding machine was used to fabricate the glossy finish particulate reinforced polymer composite (PRPC). Casting and fabrication of the composite sheet was done at varying temperature of 16±2° C.-75±2° C. and at varying casting pressure from 2 to 95 kg/cm² in single operation mode. The fabricated glossy finish PRPC sheets were cured in an oven at 60-120° C. for 12-24 hours. Different thickness (1.35 mm, 3 mm, 6 mm, 9 mm, 12 mm, 19 mm, 25 mm, 30 mm and 50 mm) of glossy finish PRPC sheets were fabricated. In lab scale experiment, size of the fabricated PRPC sheets was 32×22 cm. Up-scaling of fabricated glossy finish sheets was also done glossy finish PRPC up to the dimension of 220 cm×120 cm² with varying thickness of 6 mm, 9 mm, 12 mm, 19 mm, 25 mm, 30 mm and 50 mm) were fabricated (FIG. 6).

Properties: The following are the some of the measured properties of above described glossy finish industrial wastes based PRPC sheets:

Density: 0.22-1.2 g/cc; Water Absorption: 0.3-1.3%; Thickness Swelling: 0.2-5.3 ° %

Tensile Strength: 6.5-35 MPa; Tensile Modulus: 150-3500 MPa

Example 7

Glossy Finish Fibre Reinforced Polymer Composite (FRPC) and Particulate-Fibre Reinforced Polymer Composite (PFRPC) Sheets Using Polyurethane Resin Raw Materials: Industrial waste particulates (mineral wastes, mining wastes, polymeric wastes, marble waste, polymeric waste ground residues, fly ash, chemical industry gypsum based waste, residues arising from secondary process of zinc, copper, aluminum ,smelters, agricultural green residues, burned residues) were used as reinforced materials. Fibres such as glass fibre, sisal fibre, pine apple fibre, jute fibre, banana fibre, flax, cotton, hemp fibres were used as reinforced materials. Commercial grade bi-directional jute fabric [grams per square metre (GSM) of about 300 GSM] and chopped fabric with size of 2.0-45 mm were used. Polymer used to make glossy finish sheet was commercial grade polyurethane resin. Poly-isocyanate was used as catalyst. Industrial waste particulates used in these glossy finish green hybrid composites have particle size in range of 2.0-75

µm, density of 0.85-1.87 g/cc, porosity of 30-68% and water holding capacity in range of 25 to 110%. Fibers used in these glossy finish green fibre reinforced composites have density in range of 1.25-1.45 g/cc, elongation in range of 0.3 - 5.0%, tensile strength of 250 -650 MPa and Young's modulus in range of 5-35 GPa.

Process: Detailed laboratory experimental programme was conducted where in wide range of Industrial waste particulates (mineral wastes, mining wastes, polymeric wastes, marble waste, polymeric waste ground residues, fly ash, chemical industry gypsum based waste, residues arising from secondary process of zinc, copper, aluminum ,smelters, agricultural green residues, burned residues) were processed and 50-80% of hybrid wastes were used (one type or in combination with two or more type of waste particulates in one sheet). Similarly, a wide range of fibres (e.g. glass fibre, sisal fibre, pine apple fibre, jute fibre, banana fibre, flax, cotton, hemp fibres) were chemically processed and 5-35% of fibre or chopped fibres/textile with size of 100 µm-5 cm were used alone or hybridization with other fibers (one type or in combination of two or more types of chopped fibre in one sheet) and then both (particulates and fibers) were homogeneously mixed with the polyurethane resin based binder system using mechanical stirrer at room temperature. Poly- isocyanate in the range of 2-5% was used as catalyst. An injection followed by compression moulding system machine were used to fabricate the glossy finish fibre and particulates-fiber reinforce composite (FRPC and PFRPC). To fabricate FRPC,alone or hybridization with other fibres in different range (2-15%) with polyurethane resin were homogenously mixed. Casting and fabrication of the composite sheet was done at varying temperature of (25±2° C.-75±2° C.) and at varying casting pressure from 22 to 295 kg/cm$^2$ in single operation mode. To fabricate PFRPC, alone or hybridization with other fibres in different amount (2-15%) with polyurethane resin were homogenously mixed. Casting and fabrication of the composite sheet was done at varying temperature of (25±2° C.-75±2° C.) and at varying casting pressure from 22 to 295 kg/cm$^2$ in single operation mode. The fabricated glossy finish FRPC and PFRPC sheets were cured in an oven at 60-120° C. for 12-24 hours. Different thickness (1.35 mm, 3 mm, 6 mm, 9 mm, 12 mm, 19 mm, 25 mm, 30 mm and 50 mm) of glossy finish PRPC sheets were fabricated. In lab scale experiment, size of the fabricated PRPC sheets was 32×22 cm$^2$. Up-scaling of glossy finish PRPC sheets was also done glossy finish PRPC up to the dimension of 220 cm×120 cm with varying thickness of 6 mm, 9 mm, 12 mm, 19 mm, 25 mm, 30 mm and 50 mm were fabricated (FIG. 6).

Properties: The following are the some of the measured properties of above described glossy finish industrial wastes based PRPC and PFRPC sheets:

Density: 0.22-1.2 g/cc; Water Absorption: 0.3-1.3%; Thickness Swelling: 0.2-5.3%

Tensile Strength: 6.5-35 MPa; Tensile Modulus: 300-3500 MPa

For all above composites as described in examples (1-7), physical, water/moisture resistant and mechanical properties of PRPC, FRPC and FPRPC composite sheets were tested according to ASTM D 638 standard using ultimate tensile testing machine (UTM), LRX Plus, Lloyd, UK.Tensile modulus and strain rate were tested and recorded from the stress-strain data. Microstructure of the fractured surface (tensile fracture) of the hybrid sandwich composites was studied using Field Emission Scanning Electron Microscope (FESEM) to understand the bonding between fillers and polymers for assessing and understanding the possible application potentials.

ADVANTAGES OF THE INVENTION

The various advantages of the present process are given below.
1. Low density and glossy finish new class of green composite materials that was not yet developed anywhere in the world
2. Development of composite of required and variable specific density for a specific applications
3. Development of moisture/water resistance composite of required and variable water absorption for a specific applications
4. Development of high performance composite sheet with variable tensile strength, and tensile modulus for versatile applications.
5. High value addition to industrial waste particulates as an additives, catalyst, binder, filler and smooth surface finish and decorative agent in making lightweight composites
6. Green composites that is free from issues on moisture, water, insects, fungus, termite and corrosion.
7. Direct screen printing/laminating of pre-printed articles made on papers, plastics, flex, fabrics over surface of high performance hybrid composite particulates, fibres, particulates-fibres reinforced sheet.
8. Multidisciplinary approach for making a unique materials for multidisciplinary application and achieving the techno-economic viability and generate employment together with environmental, social and livelihood improvement.

The invention claimed is:
1. A process for making a glossy finish reinforced polymer composite sheet, the process comprising:
 a. dry and wet processing waste particulates using water having a temperature of about 60° C. to produce processed waste particulates, the processed waste particulates consisting of a combination of non-functionalized industrial waste particulates and non-functionalized natural fibers;
 b. homogeneously mixing the processed waste particulates of step a) with a polymeric binder system and a catalyst, at a temperature ranging from 60 to 80° C. for a time period ranging from 12 to 24 hours, to obtain a particulate reinforced polymer composite having 50 to 80% by volume of the processed industrial waste particulates and 5 to 35% by volume of the processed natural fibers, wherein the polymeric binder system is made of one or more of an epoxy resin, a polyester resin or a polyurethane resin;
 c. using compression molding, casting and fabricating a glossy finish composite sheet from the reinforced polymer composite of step b) at varying temperature ranging from 16±2° C. to 75±2° C. and at varying casting pressure ranging from 2 to 95 kg/cm$^2$ in a single operation mode; and
 d. natural and/or hot air oven curing the fabricated glossy finish composite sheet of step c), at a temperature ranging from 60 to 120° C. for a time period ranging from 12 to 24 hours, to obtain a glossy finish reinforced polymer composite sheet, wherein the hot air oven curing is performed by mechanical ejecting or automatic ejecting, wherein the produced glossy finish reinforced polymer composite sheet exhibits a tensile strength in the range of 22-105 MPa and a tensile modulus in range of 2450-8400 MPa.

2. The process as claimed in claim 1, wherein the industrial waste particulates are selected from the group consisting of mineral wastes, metallurgical wastes, chemical wastes, fertiliser industry wastes, mining wastes, polymeric wastes, marble waste, polymeric waste ground residues, fly ash, gypsum-containing wastes, lime-containing wastes, agricultural green residues, burned residues, smelting residues, and residues arising from secondary processing of zinc, copper, or aluminum.

3. The process as claimed in claim 1, wherein the processed industrial waste particulates produced in step a) have sizes in a range of 2.0-75 μm, a density in a range of 0.85-1.87 g/cc, a porosity in a range of 30-68% and a water holding capacity in a range of 25 to 110%.

4. The process as claimed in claim 1, wherein step b) is performed at a grinding rate of 900-4000 rpm.

5. The process of claim 1, wherein the glossy finish reinforced polymer composite sheet exhibits:
a low water absorption in the range of 0.1 to 1.32 and a variable density from 0.2 to 1.68g/cc, %.

6. The process of claim 5, wherein the produced glossy finish particulate reinforced polymer composite sheet has dimensions up to 220 cm×120 cm.

7. The process of claim 5, wherein the produced glossy finish particulate reinforced polymer composite sheet has a thickness ranging from 1.35 mm to 50 mm.

8. The process as claimed in claim 1, wherein the polymeric binder system is made of an epoxy resin and a polyester resin, and the catalyst is a combination of methyl ethyl ketone peroxide (MEKP) and cobalt naphthenate.

9. The process as claimed in claim 1, wherein the polymeric binder system is made of a polyurethane resin and the catalyst is a poly-isocyanate.

10. A process for making a glossy finish reinforced polymer composite sheet, the process comprising:
a. preparing processed industrial waste particulates and processed natural fibers, the processed industrial waste particulates being non-functionalized and exhibiting particle sizes in a range of 2.0-75 μm, a density in a range of 0.85-1.87 g/cc, a porosity in a range of 30-68% and a water holding capacity in a range of 25 to 110%, and the processed natural fibers being non-functionalized and exhibiting a density in a range of 1.25-1.45 g/cc, an elongation in a range of 0.3-5.0%, a tensile strength of 250-650 MPa, and a Young's modulus in a range of 5-35 GPa;
b. homogeneously mixing the processed industrial waste particulates and processed natural fibers of step a), a polymeric binder system and a catalyst to obtain a reinforced polymer composite having 50 to 80% by volume of the processed industrial waste particulates and 5 to 35% by volume of the processed natural fibers, wherein the polymeric binder system is made of one or more of an epoxy resin, a polyester resin and a polyurethane resin;
c. using compression molding, casting and fabricating a glossy finish composite sheet from the reinforced polymer composite of step b); and
d. natural and/or hot air oven curing the fabricated glossy finish composite sheet of step c) to obtain a glossy finish reinforced polymer composite sheet, wherein
the produced glossy finish reinforced polymer composite sheet exhibits a tensile strength in the range of 22-105 MPa and a tensile modulus in range of 2450-8400 MPa.

11. The process as claimed in claim 10, wherein the industrial waste particulates are selected from the group consisting of mineral wastes, metallurgical wastes, chemical wastes, fertiliser industry wastes, mining wastes, polymeric wastes, marble waste, polymeric waste ground residues, fly ash, gypsum-containing wastes, lime-containing wastes, agricultural green residues, burned residues, smelting residues, and residues arising from secondary processing of zinc, copper, or aluminum.

12. The process as claimed in claim 10, wherein
the polymeric binder system is made of an epoxy resin and a polyester resin, and the catalyst is a combination of methyl ethyl ketone peroxide (MEKP) and cobalt naphthenate.

13. The process as claimed in claim 10, wherein the polymeric binder system is made of a polyurethane resin and the catalyst is a poly-isocyanate.

14. The process as claimed in claim 10, wherein the glossy finish reinforced polymer composite sheet exhibits:
a low water absorption in the range of 0.1 to 1.32 and a variable density from 0.2 to 1.68 g/cc, %.

15. The process as claimed in claim 10, wherein the processed natural fibers exhibit sizes ranging from 100 μm to 5 cm.

16. The process as claimed in claim 1, wherein the processed natural fibers exhibit a density in a range of 1.25-1.45 g/cc, an elongation in a range of 0.3-5.0%, a tensile strength of 250-650 MPa, and a Young's modulus in a range of 5-35 GPa.

17. The process as claimed in claim 1, wherein the processed natural fibers exhibit sizes ranging from 100 μm to 5 cm.

* * * * *